E. N. PORTER, E. E. FOSTER & M. B. EATON.
Milk-Coolers.

No. 148,241. Patented March 3, 1874.

WITNESSES. INVENTOR.

UNITED STATES PATENT OFFICE.

EDWARD N. PORTER, E. EDWIN FOSTER, AND MELVILLE B. EATON, OF MORRISVILLE, VERMONT.

IMPROVEMENT IN MILK-COOLERS.

Specification forming part of Letters Patent No. 148,241, dated March 3, 1874; application filed February 20, 1874.

*To all whom it may concern:*

Be it known that we, EDWD. N. PORTER, E. EDWIN FOSTER, and MELVILLE B. EATON, of Morrisville, in the county of Lamoille and in the State of Vermont, have invented certain new and useful Improvements in Milk-Coolers; and do hereby declare that the following is a full, clear, and exact description thereof, reference being had to the accompanying drawings, and to the letters of reference marked thereon, making a part of this specification.

The nature of our invention consists in the construction and arrangement of a milk pan and cooler, as will be hereinafter more fully set forth.

In order to enable others skilled in the art to which our invention appertains to make and use the same, we will now proceed to describe its construction and operation, referring to the annexed drawing, in which—

Figure 1:
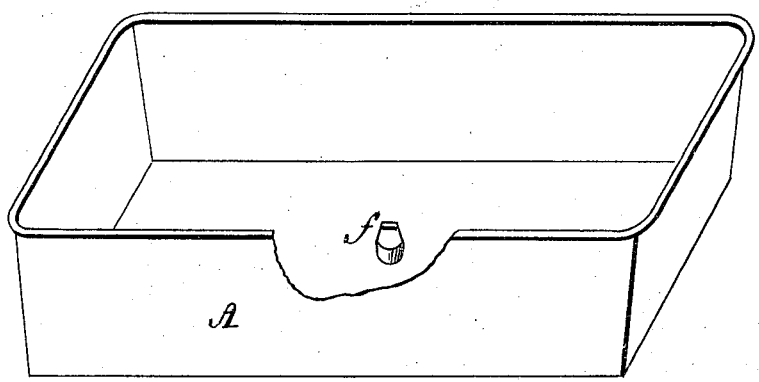
Figure 2:
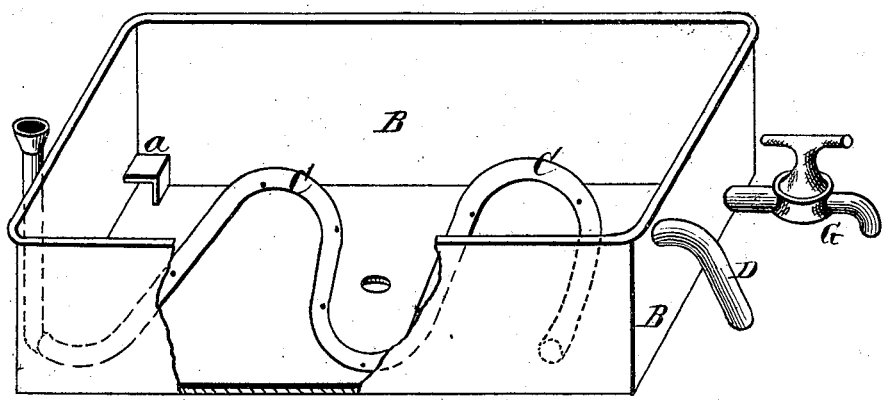
Figure 3:
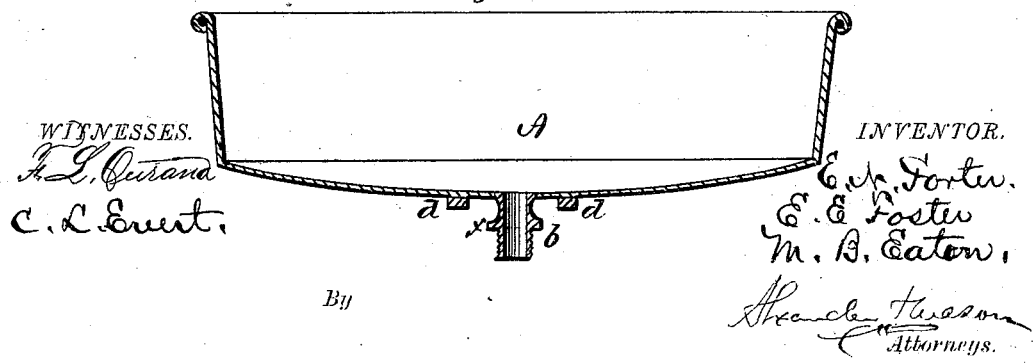

Figure 1 is a perspective view of the milk-pan. Fig. 2 is a perspective view of the cooler, and Fig. 3 is a longitudinal vertical section of the milk-pan.

A represents the milk-pan, made of any suitable dimensions and of any desired form or shape. B represents the cooler, of the same form or shape as the milk-pan A, and of such size that the pan will fit within the same, the pan resting upon stops or ledges *a* formed within the cooler at the bottom. The bottom of the milk-pan A is sprung downward, so as to be slightly concave both longitudinally and transversely, which causes all the milk to flow toward the center in emptying the pan, obviating the necessity of sweeping or brushing the milk to the outlet. *b* is the outlet-tube, attached to the center of the bottom of the pan, and passing through an aperture in the center of the bottom of the cooler B. On the under side of the bottom of the milk-pan A are attached one or more cross-bars, *d d*, on each side of the outlet-tube *b*, so as to stay and hold the bottom firmly in the concave form above described, and to prevent it from springing out of shape. The outlet-tube *b* passes through the hole in the bottom of the cooler B, and a nut is screwed on the end of the tube, so that a flange, *x*, on the tube, will come against the bottom of the cooler. Suitable washers are interposed between this flange *x*, and the bottom of the cooler, as well as between the bottom and the nut below, forming a water-tight joint. The outlet-tube *b* is closed by a stopper, *f*, of glass, metal, or other suitable material. On the bottom of the cooler B is laid a tortuous, serpentine, or coiled pipe, C, which is closed at its inner end, and its outer end extending vertically upward on the outside of the cooler to have water poured into or running into it. The pipe C within the cooler is perforated with a number of small holes, which should all be in the same horizontal plane, so that the water, which naturally seeks its level, will pass out equally through all the perforations at the same time, whereby the water is kept at an even temperature throughout the whole cooler, so as to cool the milk equally at one end of the pan as at the other. The water being thus admitted in a number of small streams to the cooler rises in the same and passes out through a pipe, D, near the top. At the bottom of the cooler, on one side, is a faucet, G, to draw off the water from the cooler, when desired.

Having thus fully described our invention, what we claim as new, and desire to secure by Letters Patent, is—

1. The milk-pan A, having its bottom sprung downward in concave form, and stayed by means of the cross-bars *d d*, substantially as and for the purposes herein set forth.

2. In a milk-cooler, the perforated tortuous water-pipe C, arranged on the bottom of the cooler, substantially as and for the purposes herein set forth.

3. The combination of the milk-pan A, having concave bottom, outlet-tube *b*, and stays *d d*, and the cooler B, perforated pipe C, outlet-pipe D, and faucet G, all substantially as and for the purposes herein set forth.

In testimony that we claim the foregoing we have hereunto set our hands this 14th day of February, 1874.

EDWARD N. PORTER.
    E. EDWIN FOSTER.
    MELVILLE B. EATON.

Witnesses:
 C. C. BURKE,
 R. V. N. BURKE.